United States Patent
Lintz et al.

(10) Patent No.: US 12,470,830 B2
(45) Date of Patent: Nov. 11, 2025

(54) ILLUMINATION CONTROL FOR AN IMAGING SYSTEM

(71) Applicant: GENTEX CORPORATION, Zeeland, MI (US)

(72) Inventors: Joshua D. Lintz, Allendale, MI (US); Steven J. Veenman, Hudsonville, MI (US); Matthew W. Remijn, Grand Rapids, MI (US); Carl L. Shearer, Jr., Allegan, MI (US)

(73) Assignee: GENTEX CORPORATION, Zeeland, MI (US)

( * ) Notice: Subject to any disclaimer, the term of this patent is extended or adjusted under 35 U.S.C. 154(b) by 160 days.

(21) Appl. No.: 18/237,952

(22) Filed: Aug. 25, 2023

(65) Prior Publication Data
US 2024/0073540 A1 Feb. 29, 2024

Related U.S. Application Data

(60) Provisional application No. 63/401,865, filed on Aug. 29, 2022.

(51) Int. Cl.
| | |
|---|---|
| *H04N 23/74* | (2023.01) |
| *B60G 3/20* | (2006.01) |
| *B60Q 3/20* | (2017.01) |
| *B60Q 3/72* | (2017.01) |
| *B60Q 3/80* | (2017.01) |
| *B60Q 11/00* | (2006.01) |

(Continued)

(52) U.S. Cl.
CPC ............. *H04N 23/74* (2023.01); *B60G 3/20* (2013.01); *B60Q 3/72* (2017.02); *B60Q 3/80* (2017.02); *B60Q 11/00* (2013.01); *H04N 23/71* (2023.01); *G06V 10/141* (2022.01); *G06V 10/143* (2022.01); *G06V 20/52* (2022.01); *G06V 20/597* (2022.01)

(58) Field of Classification Search
CPC ........ H04N 23/74; H04N 23/71; H04N 23/11; B60Q 3/20; B60Q 3/72; B60Q 3/80; B60Q 11/00; G06V 10/141; G06V 10/143; G06V 20/52; G06V 20/597; G06V 40/18
See application file for complete search history.

(56) References Cited

U.S. PATENT DOCUMENTS

| | | | | |
|---|---|---|---|---|
| 11,065,958 | B2 * | 7/2021 | Mestha | ............... G06V 10/147 |
| 2006/0087582 | A1 * | 4/2006 | Scharenbroch | ...... G06V 10/993 |
| | | | | 348/370 |

(Continued)

FOREIGN PATENT DOCUMENTS

| | | |
|---|---|---|
| JP | 2009116797 A | 5/2009 |
| JP | 2012011976 A | 1/2012 |
| KR | 20220053092 A1 | 4/2022 |

*Primary Examiner* — Fernando Alcon
(74) *Attorney, Agent, or Firm* — Price Heneveld LLP; Brian James Brewer (57) ABSTRACT

An imaging system includes an illumination source configured to illuminate at least a portion of a vehicle interior. A camera is configured to capture one or more images of the portion of the vehicle interior. A controller is in communication with the illumination source and the camera. The controller is configured to receive the one or more images, identify a glare associated with an occupant of the vehicle interior in the one or more images, and generate and communicate a signal to adjust the illumination source to limit the glare.

19 Claims, 4 Drawing Sheets

(51) Int. Cl.
*G06V 10/141* (2022.01)
*G06V 10/143* (2022.01)
*G06V 20/52* (2022.01)
*G06V 20/59* (2022.01)
*H04N 23/71* (2023.01)

(56) References Cited

U.S. PATENT DOCUMENTS

| | | | |
|---|---|---|---|
| 2008/0084499 A1* | 4/2008 | Kisacanin | A61B 5/18 348/370 |
| 2017/0096098 A1 | 4/2017 | Korthauer et al. | |
| 2018/0039846 A1* | 2/2018 | Grubb | G06N 20/00 |
| 2018/0099612 A1 | 4/2018 | Weller et al. | |
| 2018/0260640 A1* | 9/2018 | Lintz | G06V 10/143 |
| 2020/0059998 A1* | 2/2020 | Spurr | H05B 45/37 |
| 2020/0065596 A1* | 2/2020 | Maeng | B60W 40/09 |
| 2022/0315013 A1* | 10/2022 | Ben Abdelaziz | G06V 20/597 |
| 2023/0316782 A1* | 10/2023 | de Mersseman | B60Q 5/005 348/148 |
| 2023/0342891 A1* | 10/2023 | Cong | G06V 40/18 |
| 2024/0388792 A1* | 11/2024 | Pruden | H04N 23/74 |
| 2025/0074311 A1* | 3/2025 | Sobecki | H05B 47/125 |

\* cited by examiner

ILLUMINATION CONTROL FOR AN IMAGING SYSTEM

CROSS-REFERENCE TO RELATED APPLICATION

This application claims priority to and the benefit under 35 U.S.C. § 119(e) of U.S. Provisional Application No. 63/401,865, filed on Aug. 29, 2022, entitled "ILLUMINATION CONTROL FOR AN IMAGING SYSTEM," the disclosure of which is hereby incorporated herein by reference in its entirety.

FIELD OF THE DISCLOSURE

The present disclosure generally relates to illumination control for an imaging system and, more particularly, to dynamic control of illumination for an imaging system associated with a vehicle interior.

SUMMARY OF THE DISCLOSURE

According to one aspect of the present disclosure, an imaging system includes an illumination source configured to illuminate at least a portion of a vehicle interior. A camera is configured to capture one or more images of the portion of the vehicle interior. A controller is in communication with the illumination source and the camera. The controller is configured to receive the one or more images, identify a glare associated with an occupant of the vehicle interior in the one or more images, and generate and communicate a signal to adjust the illumination source to limit the glare.

According to another aspect of the present disclosure, an imaging system includes a first illumination source configured to illuminate at least a portion of a vehicle interior with a first illumination and a second illumination source configured to illuminate at least a portion of a vehicle interior with a second illumination. The imaging system further includes a camera that is configured to capture the first and second illumination in one or more images of the portion of the vehicle interior. A controller is in communication with the illumination source, the second illumination source, and the camera. The controller is configured to receive the one or more images, identify a glare associated with an occupant in the vehicle interior in the one or more images, and generate and communicate a signal to adjust one of the first illumination source and the second illumination source to limit the glare.

According to yet another aspect of the present disclosure, an imaging system includes a first illumination source configured to illuminate at least a portion of a vehicle interior with a first illumination and a second illumination source configured to illuminate at least a portion of a vehicle interior with a second illumination. A fault detection circuit is configured to identify if the first and second illumination sources are operating within a baseline range of the first operating mode. The imaging system further includes a camera that is configured to capture the first and second illumination in one or more images of the portion of the vehicle interior. A controller is in communication with the illumination source, the second illumination source, the fault detection circuit, and the camera. The controller is configured to receive the one or more images, receive, from the fault detection circuit, and if the first and second illumination sources are operating outside of the baseline range of the first operating mode. The controller is further configured to identify a glare associated with an occupant in the vehicle interior in the one or more images causing the first and second illumination sources to operate outside of the baseline range of the first operating mode, and generate and communicate a signal to switch at least one of the first illumination source and the second illumination source to a second operating mode to limit the glare.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

The present illustrated embodiments reside primarily in combinations of method steps and apparatus components related to dynamic illumination control for an imaging system in a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
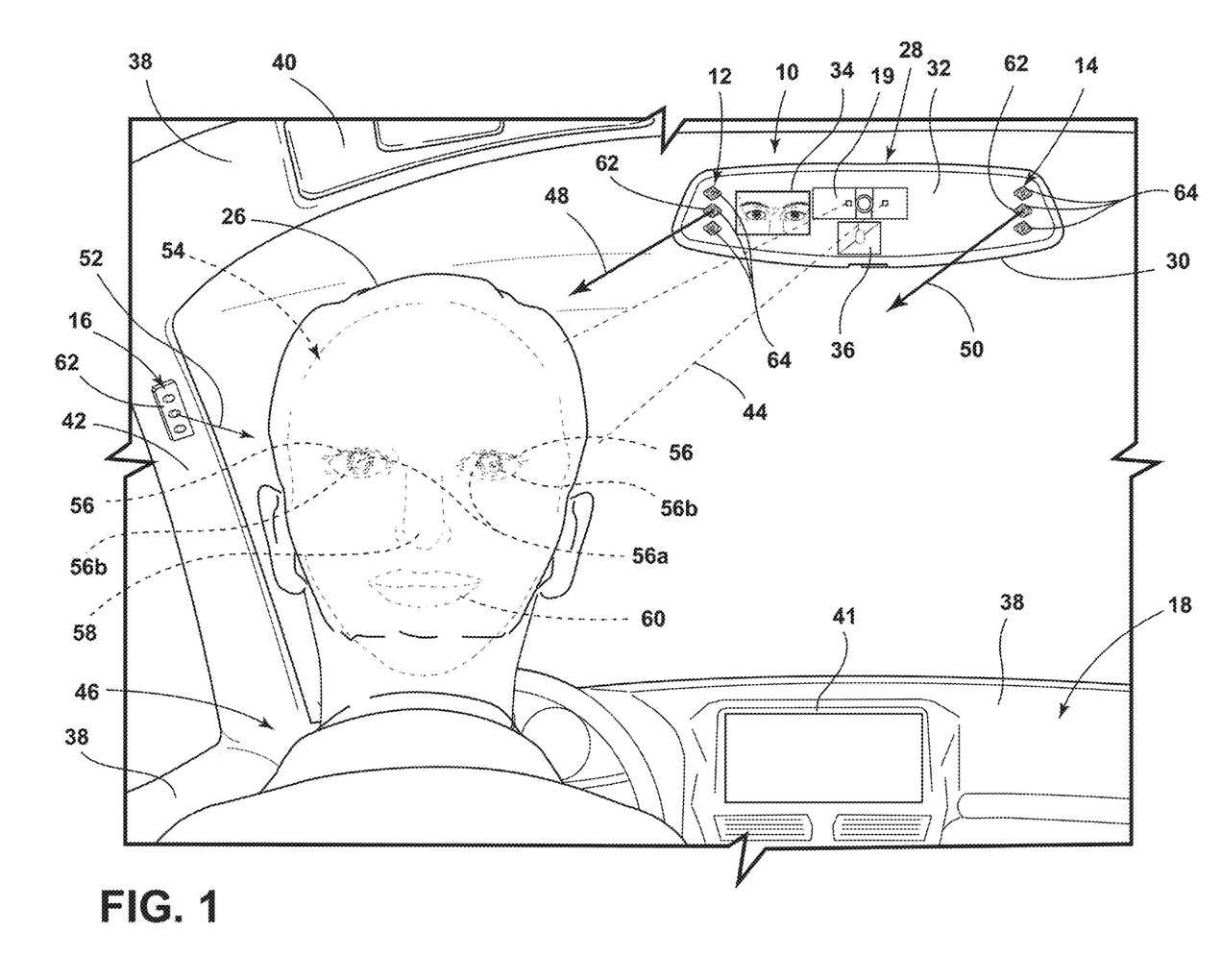
FIG. 1 is a perspective front view of an imaging system incorporated into a rearview mirror assembly, according to one aspect of the present disclosure.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to a surface of the device closest to an intended viewer, and the term "rear" shall refer to a surface of the device furthest from the intended viewer. However, it is to be understood that the disclosure may assume various alternative orientations except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-4, reference numeral 10 generally designates an imaging system that includes one or more illumination sources 12, 14, 16 configured to illuminate at least a portion of a vehicle interior 18. A camera 19 is configured to capture one or more images 20 (FIGS. 3A and 3B) of the portion of the vehicle interior 18. A controller 22 is in communication with the illumination sources 12, 14, 16 and the camera 19. The controller 22 is configured to receive the one or more images 20, identify a glare 24 associated with an occupant 26 in the vehicle interior 18 in the one or more images 20, and communicate a signal to adjust the illumination sources 12, 14, 16 to limit the glare 24.

Figure 2:
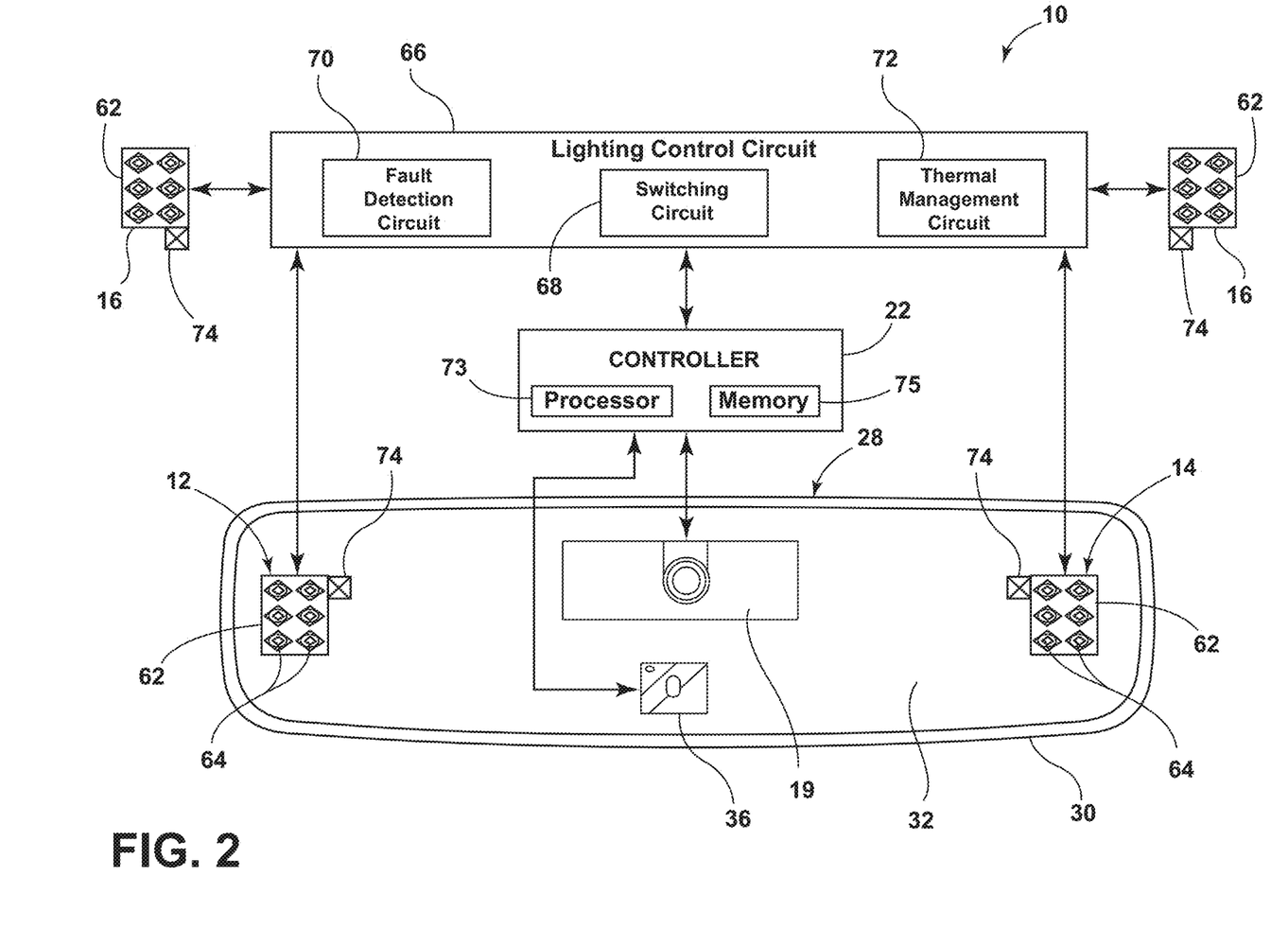
FIG. 2 is a block diagram of an imaging system, according to one aspect of the present disclosure.

Referring to FIGS. 1 and 2, the imaging system 10 of the present disclosure is exemplarily illustrated in use with a rearview assembly 28, such as an interior rearview assembly. The rearview assembly 28 includes a housing 30 with a mirror element 32. In some examples, the rearview assembly 28 incorporates an electro-optic assembly to provide variable transmittance to the mirror element 32. A visual display 34 may overlay at least a portion of the mirror element 32 (e.g., and the electro-optic assembly). In some examples, the visual display 34 is a full display mirror. An indicator 36 is provided in the housing 30 to allow notifications to be communicated to the occupant 26 or another user. The indicator 36 may be configured as a red, green, and blue (RGB) light-emitting diode (LED) operable to indicate an operating state by emitting light expressed in a red color, a green color, a blue color, or any combination thereof. Though illustrated as incorporated in the rearview assembly 28, it is contemplated that one or more components of the imaging system 10 may be incorporated in other portions of the vehicle, such as panels 38, a visor 40, a center console 41, a pillar 42, and/or the like.

With continued reference to FIGS. 1 and 2, the imaging system 10 includes the illumination sources 12, 14, 16 in the form of first and second illumination sources 12, 14 (primary illumination sources) and a third illumination source 16 (auxiliary illumination source). The first and second illumination sources 12, 14 are disposed inside the housing 30 and concealed behind the mirror element 32. The first and second illumination sources 12, 14 are disposed adjacent to left and right ends (e.g., opposite ends) of the housing 30, respectively. In some examples, the first and second illumination sources 12, 14 are separate from the housing 30 while still providing illumination in a field of view 44 of the camera 19. As illustrated in FIG. 1, the field of view 44 may cover at least a portion of the vehicle interior 18, such as a driver and/or passenger compartment 46 (e.g., front passenger and/or rear passenger compartments). The first and second illumination sources 12, 14 provide first and second illuminations 48, 50, generally illustrated by arrows, to illuminate at least a portion of the field of view 44. Further, the third, or auxiliary, illumination source 16 may provide a third illumination 52 to illuminate at least a portion of the field of view 44 from a remote location relative to the rearview assembly 28. In the example illustrated in FIG. 1, the region illuminated includes a facial region 54 of the occupant 26. In particular, the first, second, and third illuminations 48, 50, 52 may illuminate facial features of the occupant 26, such as eyes 56, a nose 58, a mouth 60, and the like, to allow for identification and tracking operations to be performed by the imaging system 10.

For example, the controller 22 is in communication with the first, second, and third illumination sources 12, 14, 16 and is configured to control the first, second, and third illumination sources 12, 14, 16 to selectively output the first, second, and third illuminations 48, 50, 52 at predetermined/programmed times or intervals. The camera 19 captures image data that corresponds to light reflected off of the occupant 26, such as the eyes 56 of the occupant 26. The controller 22 may execute an image processing method that, when executed, causes the controller 22 to determine an identity, a distraction level, a gaze direction, and/or the like, of the occupant 26, based on the processed image data. In some examples, portions of the eyes 56, such as an iris 56a, a pupil 56b, and/or the like, may be identified from the image 20 based on reflected light that originates from the first and second illumination sources 12, 14.

It is generally contemplated that one or more of the first, second, and third illumination sources 12, 14, 16 may be configured to emit the first, second, and third illuminations 48, 50, 52 in an infrared (IR) and/or a near-infrared (NIR) spectrum. For example, one or more of the first, second, and third illuminations 48, 50, 52 may be in the range of about 800 nm to 950 nm. In other examples, one or more of the first, second, and third illuminations 48, 50, 52 may be in the range of 810 nm to 940 nm. It is also contemplated that the first, second, and third illuminations 48, 50, 52 may have differing wavelengths, with, for example, the first illumination 48 having a wavelength lesser or greater than either or both of the second and third illuminations 50, 52. In general, the first, second, and third illumination sources 12, 14, 16 may be provided to illuminate biometric features to allow the camera 19 to capture biometric data associated with the occupant 26 in the images 20.

As depicted in FIGS. 1 and 2, the first, second, and third illumination sources 12, 14, 16 may each include one or more emitter banks 62 (e.g., such as an infrared emitter bank) that emit the first, second, and third illuminations 48, 50, 52, respectively. Each emitter bank 62 may include a plurality of light-emitting diodes (LEDs) 64 which may be grouped in an array or a matrix.

Referring more particularly to FIG. 1, although the camera 19 is illustrated as being housed within the housing 30 (e.g., behind the mirror element 32), the camera 19 may be spaced from the housing 30 or spaced about or around the housing 30, such as to the left or the right of the housing 30 and/or above or below the housing 30. It is also contemplated that the camera 19, or image sensor, may have a color filter array comprising an IR or a NIR filter in a filter pattern, such as an RGB-IR color filter or an RGB-NIR (RGBN) color filter. The RGB-IR or RGBN color filter may obtain information from both the visible and the IR spectrum simultaneously. This may allow the camera 19 to capture the one or more images 20, or image data, using visible light during the day or any time there is sufficient ambient lighting for the vehicle interior 18. The dual functionality may also allow the camera 19 to capture the one or more images 20 when light is primarily or partially from IR sources. In some examples, an RGB-IR or RGBN color filter may be used in conjunction with an IR emitter, such as with the first and second illumination sources 12, 14. The first, second, and third illumination sources 12, 14, 16 may be used to overwhelm the visible light during a driver monitoring mode, thereby providing uniform IR lighting and a sufficient amount of light for the capture of the one or more images 20. In some examples, the controller 22 may operate the camera 19 to employ a global shutter (not shown). The global shutter may be employed for a driver monitoring mode in bright conditions. The controller 22 may control the first, second, and third illumination sources 12, 14, 16 to operate in concert with the global shutter. For example, the controller 22 may control the first, second, and third illumination sources 12, 14, 16 to emit pulses of the first, second, and third illuminations 48, 50, 52 in concert with opening of the global shutter. The light from the first, second, and third illumination sources 12, 14, 16 may reduce interference from ambient visible light and improve image quality of the one or more images 20. It is contemplated that, in some embodiments, the camera 19 may include a first camera configured to capture light in the visible spectrum and a second camera configured to capture light in the non-visible spectrum (IR and/or NIR).

Still referring to FIG. 1, the third illumination source 16 may be provided within the vehicle interior 18 to illuminate the vehicle interior 18 from different locations than a location of the first and second illumination sources 12, 14 (e.g., from the interior rearview assembly 28). For example, the third, or auxiliary, illumination source 16 may include a lighting pod that is spaced from the rearview assembly 28 and/or mounted to various structures of the vehicle interior 18, such as pillars 42, overhead consoles, and the like. The third illumination source 16 may be aligned with the region illuminated by the first and second illumination sources 12, 14 to provide a different angle of illumination than an angle between an object (e.g., the occupant 26) and the first and second illumination sources 12, 14. For example, an angle between the third illumination source 16, the first and second illumination sources 12, 14, and the object (e.g., a portion of the seatback that is generally aligned with a head of the occupant 26) may be greater than 5°, greater than 10°, greater than 15°, greater than 20°, greater than 25°, greater than 30°, or greater than 40°. It is contemplated that the communication with the controller 22 may be wired or wireless (e.g., Bluetooth, Zigbee, or another shortwave radio frequency communication protocol). In operation, the controller 22 may control the third illumination source 16 simultaneously with, or in conjunction with, the first and second illumination sources 12, 14. As will be described further herein, the particular mode of control may be determined based on analysis of the one or more images 20 captured via the camera 19, or image sensor.

Referring more particularly to FIG. 2, the controller 22 includes or, as illustrated, is in communication with, a lighting control circuit 66. The lighting control circuit 66 includes a switching circuit 68, a fault detection circuit 70, and a thermal management circuit 72. The thermal management circuit 72 may operate in concert with other circuits, such as with the switching circuit 68 and the fault detection circuit 70 of the lighting control circuit 66 to control and monitor various aspects of the first, second, and third illuminations sources 12, 14, 16. For example, the controller 22 may communicate with the switching circuit 68 and cause the switching circuit 68 to pulse the first, second, and third illumination sources 12, 14, 16 at a particular rate, duration, and/or the like. It is contemplated that the switching circuit 68 is operable to control the first, second, and third illumination sources 12, 14, 16 independently or in concert. The switching circuit 68 may include various electronic devices, such as capacitors, timers, microcontrollers, logic arrangements independent of the controller 22, and/or the like that are configured to drive the first, second, and third illumination sources 12, 14, 16 to pulse at a particular rate or timing. In some embodiments, the switching circuit 68 may be controlled by the controller 22 to pulse emissions of light toward the occupant 26 at different times to reduce glare reflected off of a surface associated with the occupant 26. It will also be contemplated that the thermal management circuit 72 may operate independently from the other circuits to control and monitor various aspects of the first, second, and third illuminations sources 12, 14, 16.

The controller 22 may include a processor 73 and a memory 75. The processor 73 may include any suitable processor 73 and/or any suitable number of processors, in addition to or other than the processor 73. The memory 75 may comprise a single disk or a plurality of disks (e.g., hard drives), and includes a storage management module that manages one or more partitions within the memory 75. In some embodiments, the memory 75 may include flash memory, semiconductor (solid state) memory, or the like. The memory 75 may include Random Access Memory (RAM), a Read-Only Memory (ROM), or a combination thereof. The memory 75 may include instructions that, when executed by the processor 73, cause the processor 73 to, at least, perform the functions and method steps as described herein.

The fault detection circuit 70 is employed to identify whether the first, second, and third illumination sources 12, 14, 16 are operating as expected (e.g., within a baseline range) based on the control signals or instructions from the memory 75 executed by the controller 22 and/or the switching circuit 68. In some examples, the fault detection circuit 70 operates in tandem with the thermal management circuit 72 to monitor thermal properties (e.g., a temperature beyond a predetermined threshold) associated with the first, second, and third illumination sources 12, 14, 16 (in particular, e.g., the primary illumination sources, or the first and second illumination sources 12, 14). For example, the thermal management circuit 72 may include a temperature sensor 74 disposed near each of the first, second, and third illumination sources 12, 14, 16. Upon detection of a temperature that exceeds a temperature threshold, by the temperature sensor 74, the thermal management circuit 72 may communicate with the fault detection circuit 70 to report a high-temperature fault to the controller 22. In response to receiving the high-temperature fault, the controller 22 may generate a signal to communicate an indication of the high-temperature fault to the occupant 26 and/or communicate an adjustment to the switching circuit 68 to operate the first, second, and third illumination sources 12, 14, 16 at a rate, duration, energization (e.g., illumination intensity), and/or the like. For example, the adjustment may include changing (e.g., lowering) rate, duration, energization, or the like. In some examples, the imaging system 10 may operate in a high-temperature mode in which lower priority illumination (e.g., illumination for cabin monitoring broadly) may be deactivated to reduce the temperature of the first, second, and third illumination sources 12, 14, 16 while allowing for higher-priority illumination (e.g., illumination directed towards the occupant 26 for driver monitoring).

It is contemplated that the fault detection circuit 70 is configured to monitor electrical properties, such as currents, voltages, and the like, of the first, second, and third illumination sources 12, 14, 16. For example, the fault detection circuit 70 may include an H-bridge inverter that provides a free-wheeling current path in the event that one or more LEDs 64 of the first, second, and third illumination sources 12, 14, 16 fails in an open position. The fault detection circuit 70 may further be configured to detect whether a string of one or more LEDs 64 of one or more of the first, second, and third illumination sources 12, 14, 16 fails and communicates a fault to the controller 22. In response, the controller 22 may control the switching circuit 68 to operate the first, second, and third illumination sources 12, 14, 16 in a "limp-home" mode that may cause the first, second, and third illumination sources 12, 14, 16 to gradually decrease in pulse rate, duration, and/or intensity over a period of time (e.g., less than 1 second, less than 5 seconds, less than 30 seconds, several minutes, etc.).

Figure 3A:
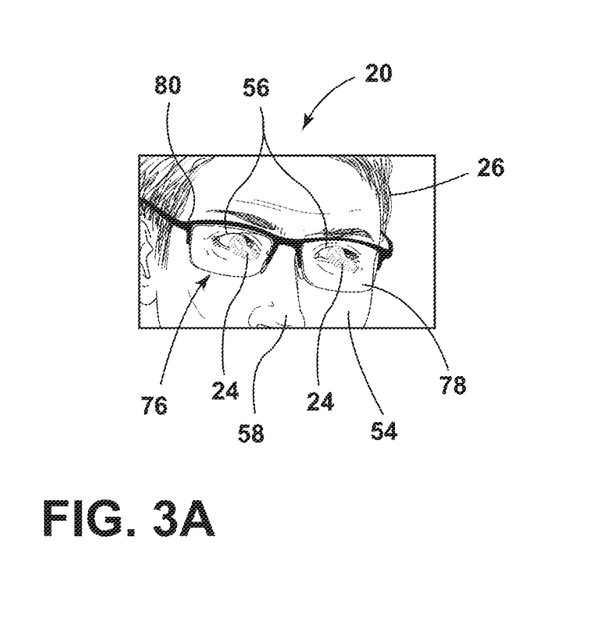
FIG. 3A is an exemplary image captured from a perspective view of an occupant of a vehicle under a first illumination condition, according to an aspect of the present disclosure.
Figure 3B:
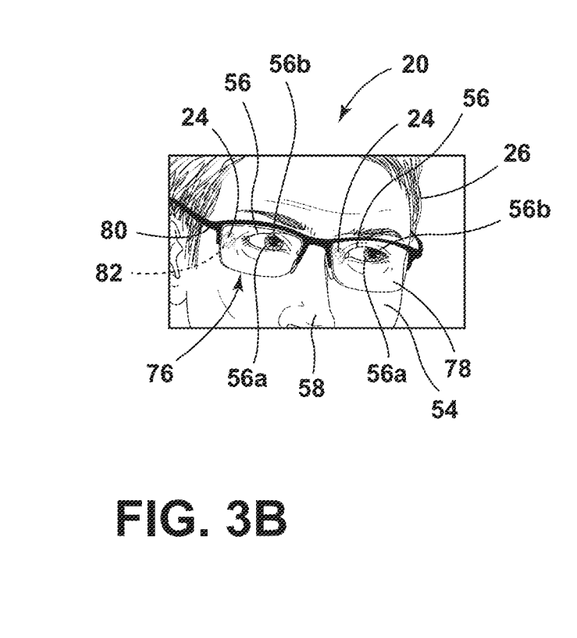
FIG. 3B is an exemplary image captured from a perspective view of an occupant in a vehicle under a second illumination condition, according to an aspect of the present disclosure.

With reference now to FIGS. 3A and 3B, in some embodiments, the imaging system 10 may operate the one or more of the first, second, and third illumination sources 12, 14, 16 dynamically to adjust and/or reduce glare 24 on a surface 76 associated with the occupant 26. For example, the surface 76 is a lens 78 of a pair of eyeglasses 80, though the particular surface 76 may vary. As illustrated in FIG. 3A, the camera 19 captures the image 20 of the eyes 56 of the occupant 26 covered by the pair of eyeglasses 80 that a glare 24 over at least a portion of tracking features of the eyes 56 (e.g., irises 56a and/or pupils 56b). In an exemplary configuration, the controller 22 processes the image data (e.g., on a pixel-by-pixel basis) associated with the image 20 of FIG. 3A in order to identify one or more pixels that corresponds to an expected position or location of the eyes 56 within the field of view 44. The controller 22 then analyzes the pixel content to determine the size and shape of the glare 24, as well as a projection angle of the glare 24. For example, in some embodiments, the controller 22 may utilize the known distance between the first and second illumination sources 12, 14 and/or the third illumination source 16 to triangulate the angle or general origination of the light causing the glare 24. For example, the controller 22 may determine that the glare 24 has an oblong and/or a tapered shape and may infer that the glare 24 is a result of light that is reflected from a light source near the camera 19 (e.g., the first or the second illumination source 12, 14). In general, the controller 22 may identify an angle of incidence to identify the light source responsible for the glare 24. Based on the image analysis, the controller 22 may adjust a pulse rate and/or an energy level associated with one or both of the primary, or first and second, illumination sources 12, 14. It is also contemplated that the controller 22 may communicate a signal to the third, or the at least one auxiliary, illumination source 16 to change a pulse rate or energy level, or to turn on or off the third illumination source 16 in response to detection of the glare 24. In some examples, in which the controller 22 identifies ambient light as causing the glare, the controller may communicate an instruction to another vehicle system (not pictured) to adjust the ambient light conditions. For example, the instruction may be communicated to an electro-optic window controller or sunroof cover to cause the window to darken or the cover to open or close in order to adjust the ambient lighting and at least partially obstruct the origin of glare of the vehicle interior 18.

With reference now to FIG. 3B, in some scenarios, the controller 22 may detect that the origination of the glare 24 is from the first and second illumination sources 12, 14 and/or the third illumination source 16. In such instances, the controller 22 may generate a signal to reduce the intensity, pulse rate, duration, and/or change which of the first and second illumination sources 12, 14 and/or the third illumination source 16 are being utilized and captured in the image 20 (e.g., based on origination angle or wavelength). For example, the image 20 captured by the camera 19 may result from the exemplary response of the imaging system 10 to the detection of the glare 24 of FIG. 3A. As demonstrated by a new position 82 of the glare 24, the controller 22 has adjusted the first, second, and third illumination sources 12, 14, 16 to reveal the tracking features of the occupant 26 (e.g., the irises 56a and/or the pupils 56b). In this way, the imaging system 10 of the present disclosure may employ an illumination system that dynamically adjusts in response to detection of glare 24 or other reflections identified from the processed image data of the one or more images 20 from the vehicle interior 18.

In some examples, the dynamic adjustment of the illumination system (e.g., first, second, and third illumination sources 12, 14, 16) is based further on determination of an orientation of the object associated with the glare 24. Continuing with the example of FIGS. 3A and 3B, the controller 22 may also determine a contour or a surface plane orientation associated with the eyeglasses 80 or lenses 78. Determination of the angle, or orientation, of the surface 76 associated with the glare 24 may allow the controller 22 to further differentiate between the particular source of the glare 24 by comparing the estimated angle of incidence to the contour of the object. As previously discussed, the camera 19 and/or the first, second, and third illumination sources 12, 14, 16 may be operable between a plurality of operating modes. For example, the camera 19 may be one or more RGBN type image sensor that captures the one or more images 20 in the visible and the infrared spectrum concurrently. In one such example of cabin-monitoring mode, the imaging system 10 employs the camera 19 to capture the one or more images 20 of the rear and front passenger compartments. In some embodiments, a plurality of images 20 are captured in a sequence (e.g., a video-type recording). When operating in the cabin monitoring mode, the imaging system 10 deactivates or maintains deactivation of the IR and/or NIR illumination sources 12, 14, 16 (e.g., the first, second, and third, or auxiliary, illumination sources 12, 14, 16) and relies on ambient light to illuminate the cabin or vehicle interior 18. In this mode of operation, sufficient ambient light may allow proper cabin monitoring and simultaneous driver monitoring. However, upon determination by the controller 22 that driver monitoring is unavailable or interfered with (e.g., glare), the imaging system 10 of the present disclosure may be configured to change modes by adjusting the first, second, and third illumination sources 12, 14, 16 and the camera 19.

With reference now to FIGS. 1-3B, in some embodiments, if it is a sunny day or otherwise an environment with a lot of ambient light and the vehicle interior 18 is sufficiently illuminated by ambient light, the imaging system 10 may continue to operate in the cabin monitoring mode and rely on RGB pixel data. However, if the driver is wearing the pair of eyeglasses 80 (e.g., sunglasses or non-tinted glasses), the controller 22 may analyze the image data to determine that the tracking features associated with the driver are no longer identifiable. In response to this determination, the controller 22 may prioritize another operating mode, such as a driver identification mode or eye tracking mode, over the cabin monitoring mode in order to monitor the driver for various reasons (e.g., distraction tracking, drowsiness tracking, etc.). When the imaging system 10 is prioritizing another operating mode (such as the driver monitoring mode), the controller 22 may energize or adjust the first, second, and third illumination sources 12, 14, 16 to project the first, second, and third illuminations 48, 50, 52 of infrared and/or and NIR light toward the driver in order to capture sufficient image data to track the eyes 56 of the driver. Upon projection of the first, second, and third illuminations 48, 50, 52, the glare 24 may be presented to conceal/obstruct the tracking features. In response to detection of the glare 24, the controller 22 adjusts and/or pulses energy levels of the first, second, and third illumination sources 12, 14, 16 to remove, limit, or adjust the glare 24 that conceals/obstructs the tracking features.

The above example is intended to be exemplary and non-limiting. In another example, the glare 24 may be a result of ambient light reflected off of the lenses 78 prior to, or unrelated to, the first, second, and third illuminations 48, 50, 52. Thus, the imaging system 10 of the present disclosure may provide for detection of whether a global illumination (e.g., ambient light) or local illumination (e.g., the illuminations 48, 50, 52) contribute to, or are the cause or source of, the glare 24. It is contemplated that the imaging system 10 of the present disclosure may mitigate the issue of glare 24 regardless of the particular source. In the example of glare 24 due to ambient light, one solution employed by the imaging system 10 may be to generate additional infrared or NIR light. Another solution may be to operate the imaging system 10 in a different monitoring mode, as previously described. For example, in a teleconferencing mode of the imaging system 10, the visible light may be captured and presented at the display 34 or another display and the first, second, and/or third (auxiliary) illumination sources 12, 14, 16 may be deactivated. However, in response to reduced ambient lighting and/or glare 24 detection, the controller 22 may be configured to adjust to a driver monitoring operating mode as previously described.

It is contemplated that the imaging system 10 (e.g., the controller 22) may identify prioritized features (e.g., eyes 56) in the image data and control the operating mode based on obstruction of the prioritized features. The imaging system 10 may also, or alternatively, identify other features, such as other facial features, the presence of mobile devices (e.g., a smartphone) in the vicinity of the driver, hands and/or fingers of the driver, and the like. In general, the prioritized features may relate to any features that are identifiable or trackable and pertinent attentiveness of the occupant 26.

Figure 4:
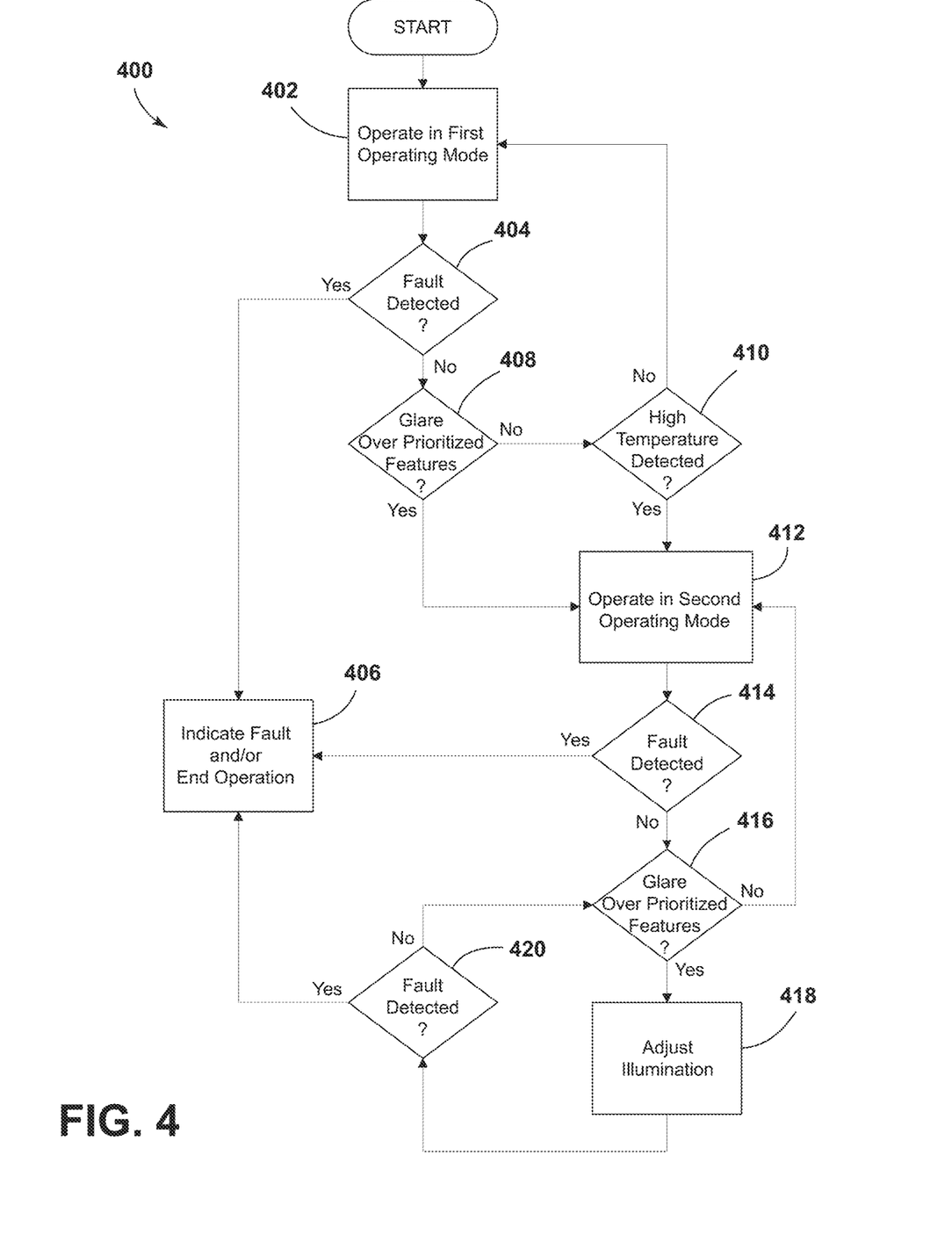
FIG. 4 is a method flow chart of operating an imaging system, according to an aspect of the present disclosure.

Referring now to FIG. 4, a method 400 of operating the imaging system 10 includes operating the imaging system 10 in a first operating mode at step 402. For example, the first operating mode may be a cabin-monitoring mode that utilizes RGB and/or IR light for full cabin illumination to perform monitoring of a vast region of the vehicle interior 18, including the driver compartment 46 of the vehicle interior 18. In the first operating mode, tracking of features of the eyes 56 of the occupant 26 (e.g., the driver), such as the irises 56a, may be prioritized over monitoring of other areas of the cabin in order to verify the identity of the driver and/or determine an alertness level of the driver. At step 404, the imaging system 10 determines whether a fault is detected and, if so, indicates the fault, including the type of fault, to the controller 22 and/or to the occupant 26 via the display 34 at step 406. It is contemplated that the determination of the presence of a fault may be performed by the controller 22 in concert with the fault detection circuit 70 and/or the thermal management circuit 72.

If a fault is not detected at step 404, the imaging system 10 may determine whether there is glare 24 overlaying prioritized features of the imaging system 10 at step 408. For example, the controller 22 may process images 20 captured by the camera 19, identify pixels associated with the glare 24, and determine that the glare 24 is in a region of the image 20 corresponding to the eyes 56 of the occupant 26. In this example, the prioritized features are the features of the eyes 56 which are concealed by the glare 24. If the glare 24 is not detected, the imaging system 10 may further detect whether there is a high temperature associated with one or more of the illumination sources 12, 14, 16 at step 410. If a high temperature is not detected, the imaging system 10 continues to function in the first operating mode (see step 402).

If either a high temperature associated with one or more of the illumination sources 12, 14, 16 is detected or the glare 24 is detected over prioritized features, the imaging system 10 switches operating modes to a second operating mode at step 402. The second operating mode may be a driver-monitoring mode that causes deactivation of illumination for the full cabin and instead focuses the illuminations 48, 50, 52 on the driver. Following step 412, the imaging system 10 may again check if a fault is detected at step 414. If not, the method 400 continues to step 416 to again check if the glare 24 is blocking prioritized features of the imaging system 10. If not, the imaging system 10 may continue to operate in the second operating mode. However, if the glare 24 is detected at step 416, the illuminations 48, 50, 52 may be adjusted at step 418. For example, the controller 22 of the imaging system 10 may adjust a pulse rate, intensity, a pulse duration, or which of the first, second, or auxiliary illumination sources 12, 14, 16 are utilized to illuminate the driver with different intensities from different angles. Step 418 may further include sub-operations previously described of identifying the illumination source 12, 14, 16 causing the glare 24 and/or predicting which illumination source 12, 14, 16 should have increased or decreased output in order to adjust the glare 24 to reveal the prioritized features (e.g., the irises 56a).

The invention disclosed herein is further summarized in the following paragraphs and is further characterized by combinations of any and all of the various aspects described therein.

According to one aspect of the present disclosure, an imaging system includes an illumination source configured to illuminate at least a portion of a vehicle interior. A camera is configured to capture one or more images of the portion of the vehicle interior. A controller is in communication with the illumination source and the camera. The controller is configured to receive the one or more images, identify a glare associated with an occupant of the vehicle interior in the one or more images, and generate and communicate a signal to adjust the illumination source to limit the glare.

According to another aspect, an illumination source includes a plurality of illumination sources and a controller is further configured to differentiate between a plurality of illumination sources in the vehicle interior to identify the illumination source causing the glare.

According to yet another aspect, a controller is further configured to differentiate between a plurality of illumination sources based on a contour of a surface associated with a glare.

According to still yet another aspect, a plurality of illumination sources includes a first illumination source and a second illumination source.

According to another aspect, the first illumination source and the second illumination source are located on opposite sides of a rearview mirror.

According to yet another aspect, the first illumination source projects a first illumination and the second illumination source projects a second illumination in a different wavelength than the first illumination.

According to still yet another aspect, the plurality of illumination sources further includes an auxiliary illumination source spaced further from the first illumination source and the second illumination source than a distance between the first illumination source and the second illumination source.

According to another aspect, the first illumination source projects a first illumination, the second illumination source projects a second illumination, and the auxiliary illumination source projects a third illumination that is different than at least one of the first and second illuminations.

According to another aspect, at least one of the first, second, and third illuminations are in the visible spectrum and another one of the first, second, and third illuminations are in the infrared or near-infrared spectrum.

According to yet another aspect, an illumination source is an emitter bank projecting an illumination and the controller is configured to adjust an intensity, pulse rate, or duration of the illumination.

According to still yet another aspect, an illumination source includes an ambient lighting source and the controller is configured to adjust transmissivity of an electro-optic element to obstruct the illumination source.

According to another aspect, a fault detection circuit configured to identify if the first and second illumination sources are operating within a baseline range.

According to another aspect of the present disclosure, an imaging system includes a first illumination source configured to illuminate at least a portion of a vehicle interior with a first illumination and a second illumination source configured to illuminate at least a portion of a vehicle interior with a second illumination. The imaging system further includes a camera that is configured to capture the first and second illumination in one or more images of the portion of the vehicle interior. A controller is in communication with the illumination source, the second illumination source, and the camera. The controller is configured to receive the one or more images, identify a glare associated with an occupant in the vehicle interior in the one or more images, and generate and communicate a signal to adjust one of the first illumination source and the second illumination source to limit the glare.

According to another aspect, the signal includes an instruction to project only one of the first or second illuminations.

According to yet another aspect, the first illumination is in a different wavelength than the second illumination.

According to still yet another aspect, the signal includes an instruction to adjust at least one of an intensity, pulse rate, or duration of at least one of the first illumination and the second illumination.

According to another aspect, a fault detection circuit is configured to identify if the first and second illumination sources are operating within a baseline range.

According to yet another aspect of the present disclosure, an imaging system includes a first illumination source configured to illuminate at least a portion of a vehicle interior with a first illumination and a second illumination source configured to illuminate at least a portion of a vehicle interior with a second illumination. A fault detection circuit is configured to identify if the first and second illumination sources are operating within a baseline range of the first operating mode. The imaging system further includes a camera that is configured to capture the first and second illumination in one or more images of the portion of the vehicle interior. A controller is in communication with the illumination source, the second illumination source, the fault detection circuit, and the camera. The controller is configured to receive the one or more images, receive, from the fault detection circuit, and if the first and second illumination sources are operating outside of the baseline range of the first operating mode. The controller is further configured to identify a glare associated with an occupant in the vehicle interior in the one or more images causing the first and second illumination sources to operate outside of the baseline range of the first operating mode, and generate and communicate a signal to switch at least one of the first illumination source and the second illumination source to a second operating mode to limit the glare.

According to another aspect, the signal includes an instruction to adjust at least one of an intensity, pulse rate, or duration of at least one of the first illumination and the second illumination.

According to yet another aspect, a thermal management circuit is configured to detect if the first and second illumination sources have a temperature beyond a predetermined threshold. The controller is configured to, if the first and second illumination sources have a temperature beyond a predetermined threshold, reduce at least one of an intensity, pulse rate, or duration of at least one of the first illumination and the second illumination.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connectors or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. An imaging system, comprising:
   a plurality of illumination sources spaced from one another and configured to illuminate at least a portion of a vehicle interior from different angles;
   a camera configured to capture one or more images of the portion of the vehicle interior; and
   a controller in communication with the illumination source and the camera, the controller configured to:
      receive the one or more images;
      identify a glare associated with an occupant in the vehicle interior in the one or more images;
      utilize the spacing between the plurality of illumination sources to differentiate between the plurality of illumination sources in the vehicle interior to identify the illumination source causing the glare; and
      generate and communicate a signal to adjust the illumination source to limit the glare.

2. The imaging system of claim 1, wherein the controller is further configured to differentiate between the plurality of illumination sources based on a contour of a surface associated with the glare.

3. The imaging system of claim 1, wherein the plurality of illumination sources includes a first illumination source and a second illumination source.

4. The imaging system of claim 3, wherein the first illumination source and the second illumination source are located on opposite sides of a rearview mirror.

5. The imaging system of claim 3, wherein the first illumination source projects a first illumination and the second illumination source projects a second illumination in a different wavelength than the first illumination and the camera includes a color filter to capture the one or more images of both the first and second illuminations.

6. The imaging system of claim 3, wherein the first and second illumination sources are located in a rearview mirror and the plurality of illumination sources further includes an auxiliary illumination source remote from the rearview mirror and spaced further from the first illumination source and the second illumination source than a distance between the first illumination source and the second illumination source.

7. The imaging system of claim 6, wherein the first illumination source projects a first illumination, the second illumination source projects a second illumination, and the auxiliary illumination source projects a third illumination that is different than at least one of the first and second illuminations.

8. The imaging system of claim 7, wherein at least one of the first, second, and third illuminations are in the visible spectrum and another one of the first, second, and third illuminations are in the infrared or near-infrared spectrum.

9. The imaging system of claim 1, wherein the plurality of illumination sources each include an emitter bank projecting an illumination and the controller is configured to adjust an intensity, pulse rate, or duration of the illumination.

10. The imaging system of claim 1, wherein the illumination source includes an ambient lighting source and the controller is configured to adjust transmissivity of an electro-optic element to obstruct the illumination source.

11. The imaging system of claim 1, further including a fault detection circuit configured to identify if the illumination source is operating within a baseline range.

12. An imaging system, comprising:
    a first illumination source configured to illuminate at least a portion of a vehicle interior with a first illumination at a first pulse rate and a second illumination source configured to illuminate at least a portion of a vehicle interior with a second illumination at a second pulse rate;
    a camera configured to capture the first illumination in one or more images of the portion of the vehicle interior with the first pulse rate and capture the second illumination in one or more images of the portion of the vehicle interior with the second pulse rate; and
    a controller in communication with the illumination source, the second illumination source, and the camera, the controller configured to:
       receive the one or more images;
       identify a glare associated with an occupant in the vehicle interior in the one or more images; and
       generate and communicate a signal to adjust one of the first illumination source and the second illumination source to limit the glare.

13. The imaging system of claim 12, wherein the signal includes an instruction to project only one of the first or second illuminations.

14. The imaging system of claim 13, wherein the first illumination is in a different wavelength than the second illumination.

15. The imaging system of claim 12, wherein the signal includes an instruction to adjust one of the first and second pulse rates.

16. The imaging system of claim 12, further including a fault detection circuit configured to identify if the first and second illumination sources are operating within a baseline range.

17. An imaging system, comprising:
    a first illumination source in a first operating mode configured to illuminate first region of a vehicle interior with a first illumination and a second illumination source in the first operating mode configured to illuminate a second region of a vehicle interior with a second illumination, wherein the first region is larger than the second region and the second region is contained within the first region;
    a fault detection circuit configured to identify if the first and second illumination sources are operating within a baseline range of the first operating mode;
    a camera configured to capture the first and second illumination in one or more images of the portion of the vehicle interior; and
    a controller in communication with the illumination source, the second illumination source, the fault detection circuit and the camera, the controller configured to:
       receive the one or more images;
       receive, from the fault detection circuit, if the first and second illumination sources are operating outside of the baseline range of the first operating mode;
       identify a glare associated with an occupant in the vehicle interior in the one or more images causing the first and second illumination sources to operate outside of the baseline range of the first operating mode; and generate and communicate a signal to switch the first illumination source to a second operating mode to limit the glare.

18. The imaging system of claim 17, wherein the signal includes an instruction to adjust at least one of an intensity, pulse rate, or duration of the first illumination.

19. The imaging system of claim 18, further including:
a thermal management circuit including a first temperature sensor located proximate the first illumination source and a second temperature sensor located proximate the second illumination source, the first and second temperature sensors configured to detect if the first and second illumination sources have a temperature beyond a predetermined threshold; and wherein the controller is further configured to, if the first and second illumination sources have a temperature beyond a predetermined threshold, reduce at least one of an intensity, pulse rate, or duration of at least one of the first illumination and the second illumination.

* * * * *